US009089835B2

(12) United States Patent
Moon et al.

(10) Patent No.: US 9,089,835 B2
(45) Date of Patent: Jul. 28, 2015

(54) CATALYSTS FOR SYNTHESIS OF LIQUID HYDROCARBONS USING SYNGAS AND PREPARATION METHODS THEREOF

(71) Applicant: KOREA INSTITUTE OF SCIENCE AND TECHNOLOGY, Seoul (KR)

(72) Inventors: Dong Ju Moon, Seoul (KR); Jong Wook Bae, Gyeonggi-do (KR); Bal Sang Lee, Gyeonggi-do (KR); Hyun Mo Koo, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 26 days.

(21) Appl. No.: 13/909,699

(22) Filed: Jun. 4, 2013

(65) Prior Publication Data

US 2014/0066292 A1 Mar. 6, 2014

(30) Foreign Application Priority Data

Aug. 29, 2012 (KR) .................. 10-2012-0094924

(51) Int. Cl.
*B01J 27/224* (2006.01)
*B01J 21/00* (2006.01)
*B01J 21/04* (2006.01)
(Continued)

(52) U.S. Cl.
CPC .............. *B01J 27/224* (2013.01); *B01J 21/04* (2013.01); *B01J 21/12* (2013.01); *B01J 23/75* (2013.01); *B01J 35/002* (2013.01); *B01J 35/109* (2013.01); *B01J 35/1014* (2013.01); *B01J 35/1061* (2013.01); *B01J 37/0201* (2013.01);
(Continued)

(58) Field of Classification Search
CPC .......... B01J 21/04; B01J 23/75; B01J 27/224; B01J 35/109; B01J 37/00; B01J 37/031; B01J 37/036
USPC .................. 502/178, 235, 260; 518/700, 715; 423/345
See application file for complete search history.

(56) References Cited

U.S. PATENT DOCUMENTS 4,249,913 A * 2/1981 Johnson et al. ................. 51/295
4,940,684 A * 7/1990 Okutani et al. ............... 502/178
(Continued)

FOREIGN PATENT DOCUMENTS

KR 1020090011457 A 2/2009

OTHER PUBLICATIONS

Maxime Lacroix, et al; "Silicon carbide foam composite containing cobalt as a highly selective and re-usable Fischer-Tropsch synthesis catalyst", Applied Catalysis A: General; vol. 397, pp. 62-72, Available online Feb. 18, 2011.
(Continued)

*Primary Examiner* — Patricia L Hailey
(74) *Attorney, Agent, or Firm* — Ladas & Parry LLP

(57) ABSTRACT

Disclosed is a $Co/Al_2O_3/SiC$ catalyst for Fischer-Tropsch synthesis exhibiting superior heat transfer and mass transport effects, wherein an $Al_2O_3/SiC$ support in which alumina is coated on silicon carbide (SiC) with superior thermal conductivity is used and cobalt (Co) is supported thereon as an active component to provide a bimodal pore size distribution, and a method for preparing same. Use of the $Al_2O_3/SiC$ support improves cobalt dispersion and enhances cobalt-support interaction, thereby inhibiting generation of cokes (carbon filaments). As a result, catalyst stability is improved and conversion of syngas (carbon monoxide and hydrogen) can be improved.

20 Claims, 3 Drawing Sheets

(51) Int. Cl.
  *B01J 23/75* (2006.01)
  *B01J 37/00* (2006.01)
  *C07C 27/00* (2006.01)
  *C07C 27/06* (2006.01)
  *C01B 31/36* (2006.01)
  *B01J 37/02* (2006.01)
  *B01J 37/03* (2006.01)
  *B01J 21/12* (2006.01)
  *B01J 35/00* (2006.01)
  *B01J 35/10* (2006.01)
  *C10G 2/00* (2006.01)

(52) U.S. Cl.
  CPC ............ *B01J37/0244* (2013.01); *B01J 37/031* (2013.01); *C10G 2/33* (2013.01)

(56) References Cited

U.S. PATENT DOCUMENTS

| | | | |
|---|---|---|---|
| 5,710,093 A | 1/1998 | Rivas et al. | |
| 7,008,560 B2 * | 3/2006 | Ramani et al. | 252/373 |
| 7,119,046 B2 * | 10/2006 | Ohno et al. | 502/327 |
| 7,186,757 B2 | 3/2007 | Espinoza et al. | |
| 7,196,037 B2 * | 3/2007 | Ohno et al. | 502/439 |
| 7,250,385 B1 * | 7/2007 | Ohno et al. | 502/178 |
| 7,910,082 B2 * | 3/2011 | Dawes et al. | 423/346 |
| 2014/0088206 A1 * | 3/2014 | Daly et al. | 518/715 |

OTHER PUBLICATIONS

Andrei Y. Khodakov, et al; "Advances in the Development of Novel Cobalt Fischer-Tropsch Catalysts for Synthesis of Long-Chain Hydrocarbons and Clean Fuels", Chemical Reviews, vol. 107, pp. 1692-1744; Published on Web May 9, 2007.

G. Leendert Bezemer, et al; "Cobalt Particle Size Effects in the Fischer-Tropsch Reaction Studied with Carbon Nanofiber Supported Catalysts", Journal American Chemical Society; vol. 128, pp. 3956-3964; Published on Web Mar. 4, 2006.

Andreas Feller, et al; "Cobalt Bluster Effects in Zirconium Promoted Co/SiO$_2$ Fischer-Tropsch Catalysts", Journal of Catalysis, vol. 185, pp. 120-130, Jul. 1999.

* cited by examiner

CATALYSTS FOR SYNTHESIS OF LIQUID HYDROCARBONS USING SYNGAS AND PREPARATION METHODS THEREOF

CROSS-REFERENCE TO RELATED APPLICATIONS

This application claims priority under 35 U.S.C. §119 to Korean Patent Application No. 10-2012-0094924, filed on Aug. 29, 2012, in the Korean Intellectual Property Office, the disclosure of which is incorporated herein by reference in its entirety.

BACKGROUND (a) Technical Field

The present invention relates to a catalyst for Fischer-Tropsch synthesis (FTS), a method for preparing same and a method for preparing liquid hydrocarbons from a syngas using same.

(b) Background Art

In general, cobalt-based catalysts are mainly used in preparation of liquid hydrocarbons from a syngas through Fischer-Tropsch synthesis (FTS). The cobalt-based catalyst is known to have high carbon monoxide conversion, long life and superior hydrocarbon selectivity due to low $CO_2$ production rate. However, because the cobalt-based catalyst favors production of methane predominantly at high temperatures of 300° C. or above, design of the catalyst for control of local temperature increase using a catalyst-bed is of importance. Due to this problem and in terms of cost reduction and enhancement of activity, a support having thermally and chemically stable pores and having a large surface area such as alumina, silica, titania, etc. is used and an active component is dispersed thereon, although heat transfer effect is lower.

According to the Anderson-Schulz-Flory (ASF) distribution, straight-chain hydrocarbons are mainly produced by the FTS reaction. In case of high-boiling-point hydrocarbons, carbon deposition may be predominant at hot spots over product desorption, thereby quickly deactivating the catalyst [*Chemical Reviews* 107 (2007) 1692]. Accordingly, in order to enhance dispersion of the active component of cobalt and to inhibit carbon deposition, a support having a large surface area, such as alumina, silica or titania described above, is often surface-treated to improve catalytic activity by controlling the particle size of supported cobalt [*Journal of American Chemical Society*, 128 (2006) 3956]. As an example of such support surface treatment, a method of inhibiting carbon deposition on the surface of a catalyst prepared using a silica-alumina support having a bimodal pore size distribution by enhancing the speed of transportation of high-boiling-point hydrocarbons produced during the FTS reaction is reported [US Patent Application Publication No. 2005/0107479 A1].

Meanwhile, a method of modifying the surface of a silica support using an enhancer such as zirconium in order to enhance reducibility of cobalt and improve selectivity for high-boiling-point hydrocarbons by inhibiting adsorption of FTS products is also reported [*Journal of Catalysis*, 185 (1999) 120].

As for methods of performing the FTS reaction using silicon carbide (SiC) as a support, it is reported that a superior catalytic activity is achieved when the FTS reaction is performed using a SiC support having superior heat transfer effect prepared by mixing with an inorganic material (e.g., silica sol) and using cobalt as an active component [U.S. Pat. No. 5,710,093]. It is also reported that a cobalt-based FTS catalyst prepared by coating an alumina sol on a silicon carbide foam having mesopores has superior catalytic activity because of improved mass transport effect owing to the large-sized pores of the silicon carbide foam [*Applied Catalysis A: General*, 397 (2011) 62]. All of these preceding researches use cobalt-based catalysts prepared by using the silicon carbide support having superior heat transfer property and enhancement of catalyst stability through improved cobalt dispersion and controlled metal-support interaction between the cobalt active component and the alumina support or improvement of catalytic activity through introduction of a bimodal pore size distribution and a method for preparing such a catalyst have not been presented yet.

The present invention aims at presenting a method for inhibiting deactivation of a catalyst using a silicon carbide support caused by deposition of hydrocarbon compounds by maximizing heat transfer effect and thus controlling hot spots as well as a method for preparing a support having a bimodal pore size distribution by controlling the pores of an alumina-coated silicon carbide support and thereby improving catalytic activity through enhanced cobalt dispersion and ensuring long-term catalyst stability through controlled interaction between cobalt and the support.

Throughout the specification, a number of publications and patent documents are referred to and cited. The disclosure of the cited publications and patent documents is incorporated herein by reference in its entirety to more clearly describe the state of the related art and the present invention.

SUMMARY

The present invention is directed to providing a method for inhibiting deactivation of a Fischer-Tropsch synthesis (FTS) catalyst caused by carbon deposition due to localized generation of hot spots using a silicon carbide support exhibiting superior heat transfer effect and a method for preparing an alumina-modified silicon carbide support having a bimodal pore size distribution and enhancing the dispersion of cobalt, which is an active component, using same.

The present invention is also directed to providing a novel catalyst for FTS reaction with the interaction between the active component of cobalt and a support controlled and thus having superior long-term stability by inhibiting deactivation of the catalyst caused by carbon deposition and exhibiting improved conversion of syngas and a method for preparing same.

In an aspect, the present invention provides a method for preparing a catalyst for FTS reaction wherein alumina having meso-pores is coated on the surface of a silicon carbide support and an active component of cobalt is supported thereon. The alumina-coated silicon carbide support may have a specific surface area of specifically 25-100 $m^2/g$ and the alumina for forming the porous support surface may be prepared by a coprecipitation method or a sol-gel method such that the proportion of the alumina is specifically 3-30 wt % based on the weight of silicon carbide. The proportion of the active component cobalt may be specifically 10-30 wt % based on the support. The prepared cobalt/alumina/silicon carbide catalyst may have a specific surface area of specifically 20-50 $m^2/g$ and a bimodal pore size distribution with pore sizes (d) of specifically 3-10 nm and specifically 10-200 nm. By introducing the bimodal pore size distribution, deactivation of the catalyst due to deposition of hydrocarbon compounds can be inhibited owing to enhanced mass transport and heat transfer effects.

More specifically, the present invention provides a method for preparing a catalyst for FTS reaction, including: a) preparing an alumina/silicon carbide support by coating porous alumina on silicon carbide having a specific surface area of specifically 5-60 m$^2$/g by a coprecipitation method or a sol-gel method and calcining at specifically 400-600° C.; and b) preparing a cobalt/alumina/silicon carbide catalyst by dissolving a cobalt precursor in an aqueous solution or alcohol solution (methanol or ethanol) by an impregnation method and supporting cobalt as an active component by evaporating the solution at 70° C. and calcining at 200-500° C.

BRIEF DESCRIPTION OF THE DRAWINGS

The above and other objects, features and advantages of the present invention will now be described in detail with reference to certain exemplary embodiments thereof illustrated in the accompanying drawings which are given hereinbelow by way of illustration only, and thus are not limitative of the invention.

DETAILED DESCRIPTION

Figure 1:
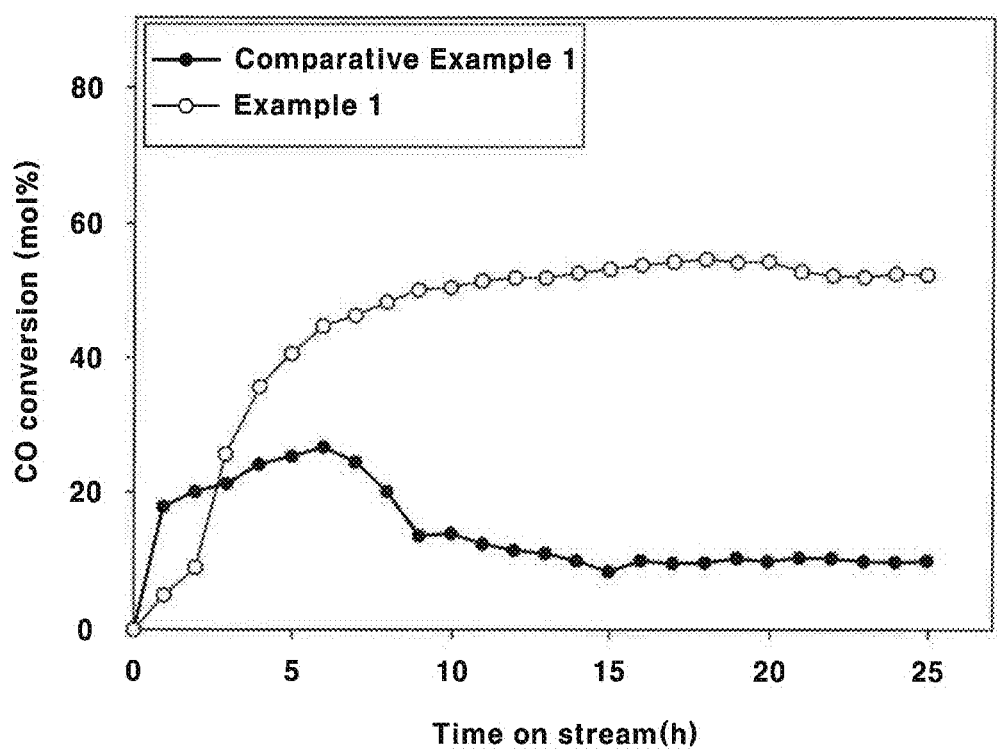
FIG. 1 shows change in catalytic activity of catalysts prepared in Example 1 and Comparative Example 1 with the reaction time of Fischer-Tropsch synthesis.

Hereinafter, reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a porous alumina-coated silicon carbide support for Fischer-Tropsch synthesis (FTS). The alumina/silicon carbide support may have a specific surface area of specifically 25-100 m$^2$/g and may be prepared by a coprecipitation method or a sol-gel method such that the porous alumina is included in an amount of specifically 3-30 wt % based on the weight of silicon carbide. The present invention also provides a cobalt/alumina/silicon carbide catalyst including a cobalt active component in an amount of specifically 10-30 wt % based on the alumina/silicon carbide support. The cobalt/alumina/silicon carbide catalyst using the support may have a specific surface area of specifically 20-50 m$^2$/g and a bimodal pore size distribution of pore sizes (d) of about 3-10 nm and about 10-200 nm. As a result, the catalyst for FTS reaction exhibits enhanced mass transport effect and heat transfer effect owing to the silicon carbide and, thus, deactivation of the catalyst caused by carbon deposition can be inhibited.

Since the prepared cobalt/alumina/silicon carbide catalyst has a specific surface area of specifically 20-50 m$^2$/g and a bimodal pore size distribution, cobalt dispersion and transport effect are enhanced and thus deactivation due to carbon deposition can be inhibited. The use of the silicon carbide having superior heat transfer effect ensures long-term catalyst stability and stable selectivity for liquid hydrocarbons owing to reduced carbon deposition caused by local temperature increase in the catalyst-bed. Accordingly, the present invention provides a method for preparing a catalyst by supporting cobalt as an active component on an alumina/silicon carbide support having a bimodal pore size distribution, which is prepared by coating porous alumina on the surface of silicon carbide, and a catalyst prepared thereby.

The silicon carbide support may be one commonly used in the art, specifically one having a specific surface area of 5-60 m$^2$/g. If the specific surface area is smaller than 5 m$^2$/g, increase of specific surface area through alumina coating is only slight and it is difficult to achieve a bimodal pore size distribution. And, if the specific surface area exceeds 60 m$^2$/g, the catalyst may not be structurally stabilized during the calcining process due to decreased thermal stability.

The coating of silicon carbide with alumina may be performed by an impregnation method, a coprecipitation method, a sol-gel method, or the like. Alumina may be used in an amount of specifically 3-30 wt % based on silicon carbide. If alumina is used in an amount less than 3 wt %, the effect presented by the present invention cannot be achieved since it is difficult to achieve a bimodal pore size distribution and improve the dispersion of cobalt. And, if alumina is used in an amount exceeding 30 wt %, the effect of local temperature increase control through enhanced heat transfer effect may not be achieved owing to decreased content of silicon carbide.

In the method for preparing a cobalt/alumina/silicon carbide catalyst of the present invention, the cobalt component may be introduced by an impregnation method, a coprecipitation method, a sol-gel method, or the like using at least one commonly used cobalt precursor selected from a nitrate, an acetate and a chloride. The content of cobalt may be specifically 10-30 wt % based on the weight of the alumina/silicon carbide support. If the content of cobalt, which is the active component of the catalyst, is less than 10 wt %, improvement of catalytic activity is slight since reducibility of cobalt decreases. And, if the content of cobalt exceeds 30 wt %, improvement of catalytic activity may be slight because of decreased dispersion of cobalt due to the blocking of the pores of the alumina/silicon carbide support and the cost of manufacturing the catalyst increases.

In accordance with the method for preparing a cobalt/alumina/silicon carbide catalyst for FTS reaction of the present invention, a bimodal pore size distribution is achieved through alumina coating. The catalyst may be prepared according to a method commonly used in the art without particular limitation. Specifically, the cobalt/alumina/silicon carbide catalyst may be prepared by supporting a cobalt precursor on a porous support, followed by drying and calcining.

A method for preparing the cobalt/alumina/silicon carbide catalyst will be described in detail.

First, an alumina precursor is coated on porous silicon carbide having a specific surface area of 5-60 m$^2$/g by a coprecipitation method or a sol-gel method and an alumina/silicon carbide support having a bimodal pore size distribution is prepared by drying and calcining the same. The catalyst is prepared to have a bimodal pore size distribution with pore sizes of about 3-10 nm and about 10-200 nm.

The alumina precursor may be one commonly used in the art without particular limitation. For example, aluminum nitrate hydrate (Al(NO$_3$)$_3$·9H$_2$O)), aluminum chloride (AlCl$_3$), aluminum isopropoxide (Al[OCH(CH$_3$)$_2$]$_3$), etc. may be used. The alumina/silicon carbide support having a bimodal pore size distribution may prepared by either of the following methods.

Firstly, the alumina/silicon carbide support may be prepared by a coprecipitation method. A coprecipitation reaction is performed using the alumina precursor and a precipitator. A basic precipitator is used to maintain pH at 7-8. Specifically, sodium carbonate ($Na_2CO_3$), potassium carbonate ($K_2CO_3$), ammonium carbonate (($NH_4$)$_2CO_3$), ammonia water, etc., may be used. First, a mixed aqueous solution containing an alumina precursor and a basic precipitator is added to a slurry solution of silicon carbide in deionized water and coprecipitation is performed at 70° C. for 2 hours at pH 7-8. After aging and calcining at 400-600° C., an alumina/silicon carbide support is obtained. Then, cobalt is supported on the as-prepared alumina/silicon carbide support using an aqueous solution containing a cobalt precursor such that the content of cobalt is 10-30 wt % based on the alumina/silicon carbide support by a commonly employed impregnation method. As a result, a cobalt/alumina/silicon carbide catalyst having a bimodal pore size distribution is prepared. The alumina precursor is coprecipitated on the silicon carbide slurry in an aqueous solution of pH 7-8 using an appropriately selected precipitator and then aged at 40-80° C. to prepare the alumina/silicon carbide support. After filtering precipitates and washing, a support containing about 3-30 wt % of alumina based on the weight of silicon carbide may be obtained by the coprecipitation method. When the aging temperature is below 40° C., it is difficult to achieve a bimodal pore size distribution through γ-alumina formation. In contrast, when the aging temperature is above 80° C., the specific surface area of alumina decreases due to the increase in particle size. The aging after the coprecipitation of the alumina precursor on the silicon carbide slurry is performed specifically for 0.5-10 hours, more specifically 1-5 hours. This aging time range is favorable for formation of a catalyst support having superior activity.

Secondly, the alumina/silicon carbide support may be prepared by a sol-gel method. A slurry solution of silicon carbide in a $C_3$-$C_4$ alcohol-based organic solvent such as 1-propanol, 2-propanol, 1-butanol or 2-butanol may be used in an amount of about 5-50 mol per 1 mol of aluminum alkoxide as an alumina precursor. After adding about 0.01-1 mol of organic carboxylic acid and about 2-12 mol of water ($H_2O$) to 1 mol of the aluminum alkoxide solution (based on the aluminum alkoxide), the mixture may be heated to obtain a boehmite sol. Crystal size and crystallinity of the boehmite sol are greatly affected by the acid used, amount thereof and reaction temperature. The larger the amount of the acid, the crystal size of boehmite decreases and the sol becomes transparent. It is known that, as the amount of acid increases, peptization of aluminum hydroxide occurs quickly due to hydrolysis of aluminum alkoxide, resulting in formation of more boehmite crystals with smaller crystal size. Accordingly, the crystal size of boehmite can be controlled with the amount of the acid used and the specific surface area, porosity, etc. of boehmite can be easily controlled therewith. The reaction is performed specifically at 80-110° C. specifically for 5-50 hours. When the reaction temperature is below 80° C., the boehmite crystal grows slowly and aluminum hydroxide impurities such as gibbsite may be formed. In contrast, when the reaction temperature is above 110° C., the crystal size of boehmite may become too large. Accordingly, it is recommended coating the alumina precursor on silicon carbide under the above-described reaction condition. The prepared boehmite sol may be calcined at about 400-600° C. to prepare a γ-alumina-coated alumina/silicon carbide support. When the calcining temperature is below 400° C., thermal stability of the support decreases since the temperature is not appropriate for generation of γ-alumina. In contrast, when the calcining temperature is above 600° C., specific surface area may decrease due to phase change of alumina. Accordingly, it is recommended to prepare the alumina/silicon carbide support under the above-described condition.

The alumina/silicon carbide support is prepared by using about 3-30 wt % of alumina based on silicon carbide. When alumina is used in an amount less than 3 wt %, it is difficult to achieve a bimodal pore size distribution and improved cobalt dispersion. In contrast, when alumina is used in an amount exceeding 30 wt %, the effect of temperature control of the catalyst-bed owing to enhanced heat transfer effect may be insufficient because of decreased silicon carbide content.

Next, a cobalt/alumina/silicon carbide catalyst is prepared using the alumina/silicon carbide support prepared by the coprecipitation method or the sol-gel method. The catalyst may be prepared by an impregnation method, a coprecipitation method, a sol-gel method, or the like using at least one cobalt precursor commonly used in the art, which is selected from a nitrate, an acetate and a chloride. The catalyst may be prepared such that the content of cobalt is specifically 10-30 wt % based on the weight of the alumina/silicon carbide support.

The prepared cobalt/alumina/silicon carbide catalyst may have a specific surface area of about 20-50 $m^2/g$ and a bimodal pore size distribution. As a result, deactivation of the catalyst can be inhibited through enhanced cobalt dispersion and mass transport effect. Further, long-term stability of the catalyst can be ensured through enhanced heat transfer effect and, at the same time, stable selectivity for liquid hydrocarbons can be achieved. The drying, calcining, etc. of the catalyst can be performed according to methods commonly employed in the art without particular limitation.

After the cobalt/alumina/silicon carbide catalyst is dried at about 100° C. or above, followed by calcining at about 300-600° C., it may be reduced at about 200-600° C. under hydrogen atmosphere. The reduced catalyst for FTS reaction may be used for FTS reaction under the condition commonly employed in the art. Specifically, the FTS reaction may be performed at a reaction temperature of about 200-300° C., at a reaction pressure of about 5-30 kg/$cm^2$ and a space velocity of about 1000-20000 $h^{-1}$ but is not limited thereto.

EXAMPLES

The present invention will be described in more detail through examples. The following examples are for illustrative purposes only and it will be apparent to those skilled in the art not that the scope of this invention is not limited by the examples.

Example 1

Porous silicon carbide for use as a support was calcined at 500° C. for 2 hours to remove impurities and water present in pores. 3.75 g of aluminum nitrate hydrate (Al($NO_3$)$_3$.9$H_2O$) and 1.19 g of $Na_2CO_3$ as a precipitator, based on 5 g of the silicon carbide, were respectively dissolved in 100 mL of water and an alumina/silicon carbide support was prepared by a coprecipitation method. Coprecipitation was performed at 70° C. using a slurry solution containing silicon carbide. After the coprecipitation was completed, followed by aging for 2 hours, filtering and washing, the resultant was dried in an oven of 100° C. for at least 10 hours and then calcined at 500° C. for 3 hours to obtain an alumina/silicon carbide support in powder form. The prepared alumina/silicon carbide support contained 10 wt % of alumina based on the weight of silicon carbide and had a specific surface area of 25.5 $m^2/g$.

3 g of the prepared alumina/silicon carbide support in powder form and 2.70 g of cobalt nitrate (Co($NO_3$)$_2$.6$H_2O$) as a cobalt precursor were dissolved in 60 mL of deionized water and, after mixing, stirred at room temperature for at least 12 hours. Subsequently, a cobalt/alumina/silicon carbide catalyst was obtained in powder form by drying at 100° C. for at least 12 hours. The catalyst had a composition of 15 wt % cobalt/10 wt % alumina/silicon carbide (hereinafter, 15% Co/10% Al$_2$O$_3$—SiC (P)), a specific surface area of 21.7 m$^2$/g and a bimodal pore size distribution with pores having a pore size satisfying 3 nm<d<10 nm and a pore volume of 0.036 cm$^3$/g and pores having a pore size satisfying 10 nm<d<200 nm and a pore volume of 0.081 cm$^3$/g.

Fischer-Tropsch synthesis (FTS) was performed using a ⅜-inch Inconel fixed-bed reactor and using 0.2 g of the catalyst. After reducing for 12 hours at 400° C. under hydrogen (5 vol % Hz/He) atmosphere, FTS reaction was carried out under a condition of a reaction temperature of 230° C., a reaction pressure of 20 kg/cm$^2$ and a space velocity (SV) of 4000 L/kg cat/hr with the molar ratio of reactants carbon monoxide:hydrogen:nitrogen (internal standard) fixed at 30:60:10. The result is summarized in Table 1 as an average value for 10 hours after 40 hours of reaction time when catalytic activity was stabilized.

Example 2

An alumina/silicon carbide support was prepared in the same manner as in Example 1, except that 1.88 g of aluminum nitrate hydrate (Al(NO$_3$)$_3$.9H$_2$O) and 0.60 g of Na$_2$CO$_3$ as a precipitator were used based on 5 g of silicon carbide. The support contained 5 wt % of alumina based on the weight of silicon carbide and had a specific surface area of 28.6 m$^2$/g. A catalyst prepared using 3 g of the prepared alumina/silicon carbide support in powder form and 2.70 g of cobalt nitrate (Co(NO$_3$)$_2$.6H$_2$O) as a cobalt precursor had a composition of 15 wt % cobalt/5 wt % alumina/silicon carbide (hereinafter, 15% Co/5% Al$_2$O$_3$—SiC(P)), a specific surface area of 23.9 m$^2$/g and a bimodal pore size distribution with pores having a pore size satisfying 3 nm<d<10 nm and a pore volume of 0.043 cm$^3$/g and pores having a pore size satisfying 10 nm<d<200 nm and a pore volume of 0.082 cm$^3$/g. FTS result is summarized in Table 1 as an average value for 10 hours after 40 hours of reaction time when catalytic activity was stabilized.

Example 3

An alumina/silicon carbide support was prepared in the same manner as in Example 1, except that 5.63 g of aluminum nitrate hydrate (Al(NO$_3$)$_3$.9H$_2$O) and 1.79 g of Na$_2$CO$_3$ as a precipitator were used based on 5 g of silicon carbide. The support contained 15 wt % of alumina based on the weight of silicon carbide and had a specific surface area of 27.1 m$^2$/g. A catalyst prepared using 3 g of the prepared alumina/silicon carbide support in powder form and 2.70 g of cobalt nitrate (Co(NO$_3$)$_2$.6H$_2$O) as a cobalt precursor had a composition of 15 wt % cobalt/15 wt % alumina/silicon carbide (hereinafter, 15% Co/15% Al$_2$O$_3$—SiC(P)), a specific surface area of 23.2 9 m$^2$/g and a bimodal pore size distribution with pores having a pore size satisfying 3 nm<d<10 nm and a pore volume of 0.039 cm$^3$/g and pores having a pore size satisfying 10 nm<d<200 nm and a pore volume of 0.080 cm$^3$/g. FTS result is summarized in Table 1 as an average value for 10 hours after 40 hours of reaction time when catalytic activity was stabilized.

Example 4

For preparation of an alumina/silicon carbide support by a sol-gel method, a slurry containing silicon carbide was prepared first by mixing 200 mL of a 2-propanol solution was mixed with 0.8 g of aluminum isopropoxide. Then, amorphous aluminum hydroxide was formed by hydrolysis by adding 0.024 g of acetic acid and 0.43 g of water to the solution. A slurry solution was prepared with the molar ratio of reactants aluminum isopropoxide:acetic acid:water fixed at 1:0.1:6. The prepared slurry solution was aged at 80° C. for 20 hours while refluxing 2-propanol and then dried in an oven maintained at 100° C. to obtain a boehmite-containing silicon carbide powder. The boehmite-containing silicon carbide powder was calcined at 500° C. for 5 hours to obtain an alumina/silicon carbide support. The support had a specific surface area of 32.8 m$^2$/g.

A catalyst prepared using 3 g of the alumina/silicon carbide support in powder form prepared by the sol-gel method and 2.70 g of cobalt nitrate (Co(NO$_3$)$_2$.6H$_2$O) as a cobalt precursor had a composition of 15 wt % cobalt/4 wt % alumina/silicon carbide (hereinafter, 15% Co/4% Al$_2$O$_3$—SiC(SG)). The catalyst had a specific surface area of 24.8 m$^2$/g and a bimodal pore size distribution with pores having a pore size satisfying 3 nm<d<10 nm and a pore volume of 0.045 cm$^3$/g and pores having a pore size satisfying 10 nm<d<200 nm and a pore volume of 0.086 cm$^3$/g. FTS was performed under the same reaction condition as in Example 1. The result is summarized in Table 1 as an average value for 10 hours after 60 hours of reaction time when catalytic activity was stabilized.

Comparative Example 1

A catalyst was prepared in the same manner as in Example 1, using 3 g of alumina-uncoated silicon carbide having a specific surface area of 18 m$^2$/g and 2.70 g of cobalt nitrate (Co(NO$_3$)$_2$.6H$_2$O) as a cobalt precursor. The catalyst had a composition of 15 wt % cobalt/silicon carbide (hereinafter, 15% Co/SiC(P)). The catalyst had a specific surface area of 16.7 m$^2$/g and a unimodal pore size distribution with pores having a pore size satisfying 10 nm<d<200 nm and a pore volume of 0.096 cm$^3$/g. FTS result is summarized in Table 1 as an average value for 10 hours after 40 hours of reaction time when catalytic activity was stabilized.

Comparative Example 2

An alumina/silicon carbide support was prepared in the same manner as in Example 1, using 0.94 g of aluminum nitrate hydrate (Al(NO$_3$)$_3$.9H$_2$O) and 0.30 g of Na$_2$CO$_3$ as a precipitator per 5 g of silicon carbide. The support contained 2.5 wt % of alumina based on the weight of silicon carbide and had a specific surface area of 22.7 m$^2$/g. A catalyst prepared using 3 g of the prepared alumina/silicon carbide support in powder form and 2.70 g of cobalt nitrate (Co(NO$_3$)$_2$. 6H$_2$O) as a cobalt precursor had a composition of 15 wt % cobalt/2.5 wt % alumina/silicon carbide (hereinafter, 15% Co/2.5% Al$_2$O$_3$—SiC(P)), a specific surface area of 19.5 m$^2$/g and a bimodal pore size distribution with pores having a pore size satisfying 3 nm<d<10 nm and a pore volume of 0.031 cm$^3$/g and pores having a pore size satisfying 10 nm<d<200 nm an value d a pore volume of 0.099 cm$^3$/g. FTS result is summarized in Table 1 as an average for 10 hours after 40 hours of reaction time when catalytic activity was stabilized.

TABLE 1

|  | $Al_2O_3/SiC$ (weight ratio) | CO conversion (carbon mol %) | Carbon selectivity for $C_1/C_2$-$C_4/C_5$ or higher (carbon mol %) | Specific surface area ($m^2/g$) | Pore volume ($cm^3/g$) (3 nm < d < 10 nm) | Pore volume ($cm^3/g$) (10 nm < d < 200 nm) |
|---|---|---|---|---|---|---|
| Example 1 | 10 | 53.2 | 2.6/5.5/91.9 | 21.7 | 0.036 | 0.081 |
| Example 2 | 5 | 46.3 | 5.0/12.5/82.5 | 23.9 | 0.043 | 0.082 |
| Example 3 | 15 | 38.1 | 4.2/9.1/86.7 | 23.2 | 0.039 | 0.080 |
| Example 4* | 4 | 24.7 | 5.2/10.2/84.6 | 24.8 | 0.045 | 0.086 |
| Comparative Example 1 | 0 | 9.5 | 2.8/5.2/92.0 | 16.7 | — | 0.096 |
| Comparative Example 2 | 2.5 | 16.9 | 12.7/24.5/62.8 | 19.5 | 0.031 | 0.099 |

*Alumina was coated by a sol-gel method. FTS was performed at a space velocity of 3000 L/kg cat/hr As seen from Table 1, Examples 1-4 wherein cobalt/alumina/silicon carbide catalysts according to the present invention were used showed better syngas conversion and selectivity for liquid hydrocarbons than Comparative Examples 1-2. The cobalt/alumina/silicon carbide catalysts prepared using the silicon carbide supports on which alumina was coated by the coprecipitation method or the sol-gel method had a specific surface area of 20-50 $m^2/g$, contained 3-30 wt % of alumina based on the weight of silicon carbide and exhibited a bimodal pore size distribution with pore sizes of 3-10 nm and 10-200 nm.

In contrast, the alumina-uncoated catalyst of Comparative Example 1 or the catalyst containing less than 3% of alumina based on the weight of silicon carbide (Comparative Example 2) did not exhibit superior activity. It is thought that the reason is because the catalyst having a bimodal pore size distribution has enhanced mass transport effect and heat transfer effect and thus deactivation of the catalyst by carbon deposition can be inhibited. When alumina is not contained at all or contained in small amount as in Comparative Examples 1-2, a poor catalytic activity is exhibited since a bimodal pore size distribution is not achieved or cobalt dispersion is not improved. Accordingly, it can be seen that the catalyst prepared using the alumina-coated silicon carbide support according to the present invention has enhanced catalytic activity owing to the bimodal pore size distribution.

Figure 2:
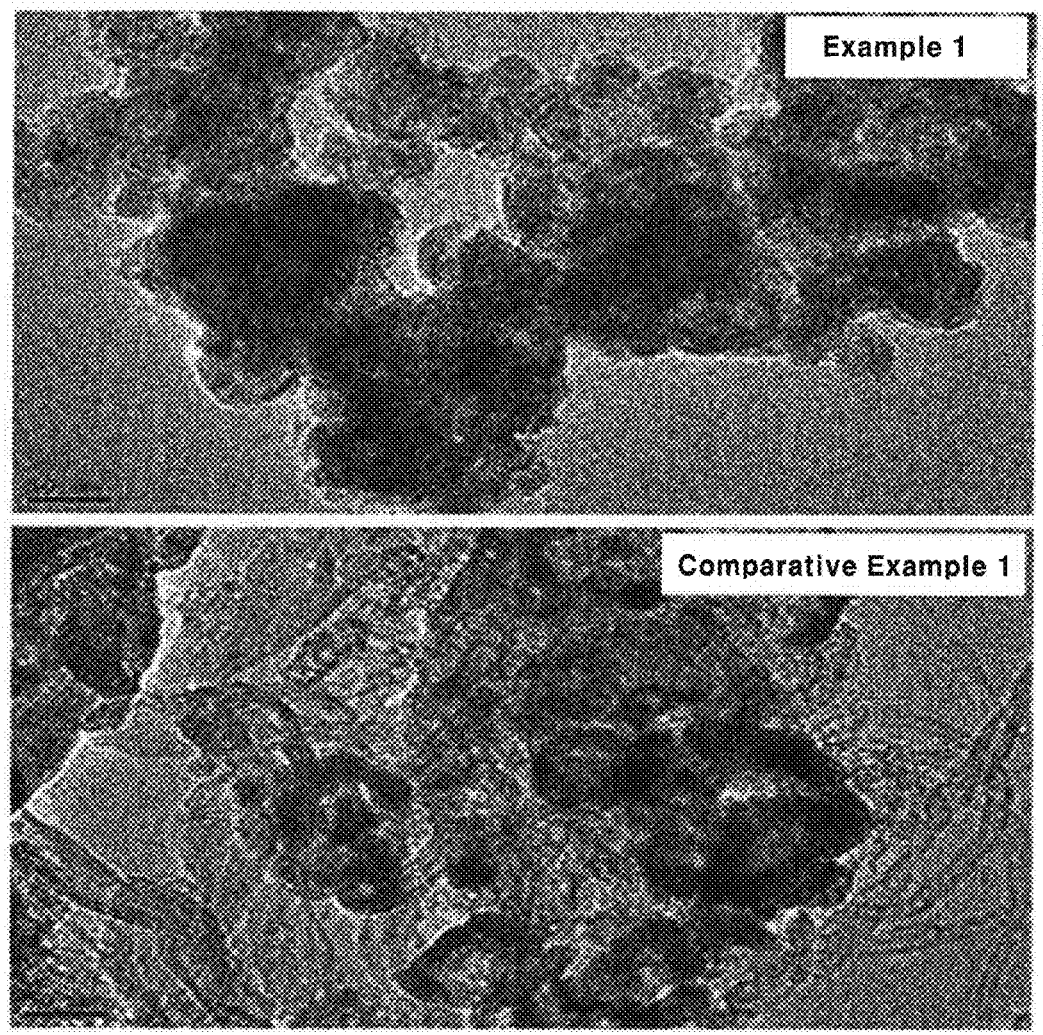
FIG. 2 shows TEM images showing deactivation of catalysts prepared in Example 1 and Comparative Example 1.
Figure 3:
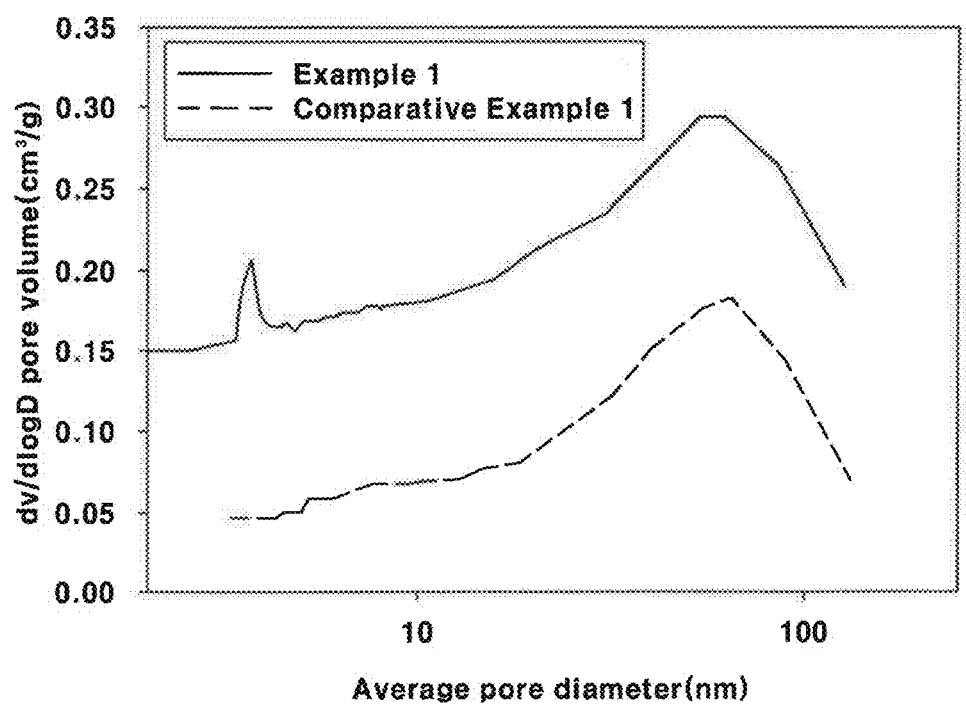
FIG. 3 shows pore size distributions of catalysts prepared in Example 1 and Comparative Example 1. The alumina-coated catalyst of Example 1 exhibits a bimodal pore size distribution whereas the alumina-uncoated catalyst of Comparative Example 1 exhibits a unimodal pore size distribution.

FIG. 1 shows a result of performing FTS reaction using the catalysts prepared in Example 1 and Comparative Example 1. It can be seen that the catalyst of Example 1 shows constant and very stable conversion with reaction time, which is attributable to the inhibited catalyst deactivation owing to bimodal pore size distribution and enhanced mass transport and heat transfer effects. FIG. 2 shows TEM images of the catalysts prepared in Example 1 and Comparative Example 1 after the reaction. It is though that the alumina-uncoated catalyst of Comparative Example 1 suffered rapid deactivation due to deposition of carbon filaments. FIG. 3 shows pore size distributions of the catalysts prepared in Example 1 and Comparative Example 1. The alumina-coated catalyst of Example 1 exhibited a bimodal pore size distribution with pore sizes 3-10 nm and 10-200 nm, whereas the alumina-uncoated catalyst of Comparative Example 1 exhibited a unimodal pore size distribution.

The FTS reaction allowing production of a syngas from natural gas and coal is drawing a lot of attentions recently as a method for preparing a liquid fuel capable of replacing petroleum. Hence, development of a high-performance catalyst for FTS reaction is becoming an important technical issue. The cobalt/alumina/silicon carbide catalyst of the present invention exhibits a bimodal pore size distribution, improved cobalt dispersion and enhanced heat transfer effect.

Since deactivation of the catalyst due to carbon deposition can be inhibited and improved liquid hydrocarbon productivity and long-term catalyst stability can be ensured, the catalyst will be useful in the development of gas to liquids (GTL) processes.

The present invention has been described in detail with reference to specific embodiments thereof. However, it will be appreciated by those skilled in the art that various changes and modifications may be made in these embodiments without departing from the principles and spirit of the invention, the scope of which is defined in the appended claims and their equivalents.

What is claimed is:

1. A method for preparing a cobalt/alumina/silicon carbide ($Co/Al_2O_3/SiC$) catalyst for Fischer-Tropsch synthesis, comprising:
    obtaining an alumina/silicon carbide support by modifying the surface of silicon carbide (SiC) with alumina ($Al_2O_3$), wherein obtaining the alumina/silicon carbide support is performed by a sol-gel method comprising adding 5-50 mol of at least one $C_3$-$C_4$ alcohol-based organic solvent selected from a group consisting of 1-propanol, 2-propanol, 1-butanol and 2-butanol and 0.01-1 mol of an organic carboxylic acid and 2-12 mol of water ($H_2O$) to a slurry solution containing silicon carbide, 1 mol of aluminum alkoxide as an alumina precursor, and heating to obtain a boehmite sol; and
    supporting an aqueous solution comprising a cobalt precursor on the support.

2. The method according to claim 1, wherein the reaction for obtaining the boehmite sol is performed at 80-110° C. for 5-50 hours.

3. The method according to claim 2, which further comprises drying the boehmite sol at 100° C. or above and then calcining at 400-600° C.

4. The method according to claim 1, wherein said supporting the aqueous solution comprising a cobalt precursor on the support is performed by an impregnation method, a coprecipitation method or a sol-gel method using at least one cobalt precursor selected from a nitrate, an acetate and a chloride.

5. The method according to claim 1, wherein said supporting the aqueous solution comprising a cobalt precursor on the support further comprises drying at 100° C. or above, calcining at 300-600° C. and reducing at 200-600° C. under a hydrogen atmosphere.

6. The method according to claim 1, wherein the silicon carbide has a specific surface area of 5-60 $m^2/g$.

7. The method according to claim 1, wherein the alumina/silicon carbide support comprises 3-30 wt % of alumina based on the weight of silicon carbide.

8. The method according to claim 1, wherein the alumina/silicon carbide support has a specific surface area of 25-100 m$^2$/g.

9. The method according to claim 1, wherein the cobalt/alumina/silicon carbide catalyst comprises 10-30 wt % of cobalt.

10. The method according to claim 1, wherein the cobalt/alumina/silicon carbide catalyst has a specific surface area of 20-50 m$^2$/g.

11. A cobalt/alumina/silicon carbide(Co/Al$_2$O$_3$/SiC) catalyst for Fischer-Tropsch synthesis prepared by the method according to claim 1, wherein the catalyst has a specific surface area of 20-50 m$^2$/g and a bimodal pore size distribution with pore sizes 3-10 nm and 10-200 nm.

12. A method for preparing a cobalt/alumina/silicon carbide (Co/Al$_2$O$_3$/SiC) catalyst for Fischer-Tropsch synthesis, comprising:
    obtaining an alumina/silicon carbide support by modifying the surface of silicon carbide (SiC) with alumina (Al$_2$O$_3$); and
    supporting an aqueous solution comprising a cobalt precursor on the support, wherein the cobalt/alumina/silicon carbide catalyst has a bimodal pore size distribution with pore sizes 3-10 nm and 10-200 nm.

13. The method according to claim 12, wherein the cobalt/alumina/silicon carbide catalyst comprises 10-30 wt % of cobalt.

14. The method according to claim 12, wherein the cobalt/alumina/silicon carbide catalyst has a specific surface area of 20-50 m$^2$/g.

15. A method for preparing a cobalt/alumina/silicon carbide (Co/Al$_2$O$_3$/SiC) catalyst for Fischer-Tropsch synthesis, comprising:
    obtaining an alumina/silicon carbide support by modifying the surface of silicon carbide (SiC) with alumina (Al$_2$O$_3$), wherein said obtaining the alumina/silicon carbide support is performed by a coprecipitation method using at least one basic precipitator selected from a group consisting of sodium carbonate, potassium carbonate, ammonium carbonate and ammonia water while maintaining pH at 7-8; and
    supporting an aqueous solution comprising a cobalt precursor on the support.

16. The method according to claim 15, wherein said supporting the aqueous solution comprising a cobalt precursor on the support is performed by an impregnation method, a coprecipitation method or a sol-gel method using at least one cobalt precursor selected from a nitrate, an acetate and a chloride.

17. The method according to claim 15, wherein said supporting the aqueous solution comprising a cobalt precursor on the support further comprises drying at 100° C. or above, calcining at 300-600° C. and reducing at 200-600° C. under a hydrogen atmosphere.

18. The method according to claim 15, wherein the silicon carbide has a specific surface area of 5-60 m$^2$/g.

19. The method according to claim 15, wherein the alumina/silicon carbide support comprises 3-30 wt % of alumina based on the weight of silicon carbide.

20. The method according to claim 15, wherein the alumina/silicon carbide support has a specific surface area of 25-100 m$^2$/g.

* * * * *